April 4, 1967　　　　　H. PEARSON　　　　　3,312,066
LOW DRAG POD FOR A GAS TURBINE ENGINE
Filed March 11, 1965　　　　　　　　　　　2 Sheets-Sheet 1

Inventor
Harry Pearson
By
Cushman, Darby & Cushman
Attorney

# United States Patent Office 3,312,066
Patented Apr. 4, 1967

3,312,066
LOW DRAG POD FOR A GAS TURBINE ENGINE
Harry Pearson, Acrefield, Turnditch, England, assignor to Rolls-Royce Limited, Derby, England, a British company
Filed Mar. 11, 1965, Ser. No. 438,939
Claims priority, application Great Britain, May 13, 1964, 20,020/64
6 Claims. (Cl. 60—226)

This invention concerns a gas turbine engine, e.g. a gas turbine engine mounted within a pod.

The problem of designing a suitable low drag pod for the mounting therein of a gas turbine engine has proved a difficult one in practice because, if the intake length and contraction of the outer surface of the pod is reduced to obtain low pod drag, this is liable to produce a pod in which there will be breakaway from the intake lip thereof under low forward speed conditions.

According therefore to the present invention, there is provided a gas turbine engine provided with an air intake having an intake lip characterised in that the intake lip is not disposed forwardly of the leading edges of the stage of blades at the upstream end of the engine.

It will be appreciated that, in the case of the present invention, if there should be any tendency for breakaway to occur from the said intake lip, this may be at least partially counteracted by the centrifugal field created by the whirl angles at the tips of the said blades.

The forward edge of the said intake lip may if desired, be radially aligned with the half chord points of the said blades.

The said blades may be constituted by first stage rotor blades of the engine compressor.

Alternatively, the said blades may be constituted by inlet guide vanes of the engine compressor, the said intake lip being disposed forwardly of first stage rotor blades of the said compressor. Thus the forward edge of the said intake lip may be radially aligned with the trailing edges of the said inlet guide vanes.

The invention is of particular value where the gas turbine engine, which may, for example, be mounted within a pod, is a by-pass engine and especially where the by-pass engine has a by-pass ratio of at least 1.5:1.

Figure 1:
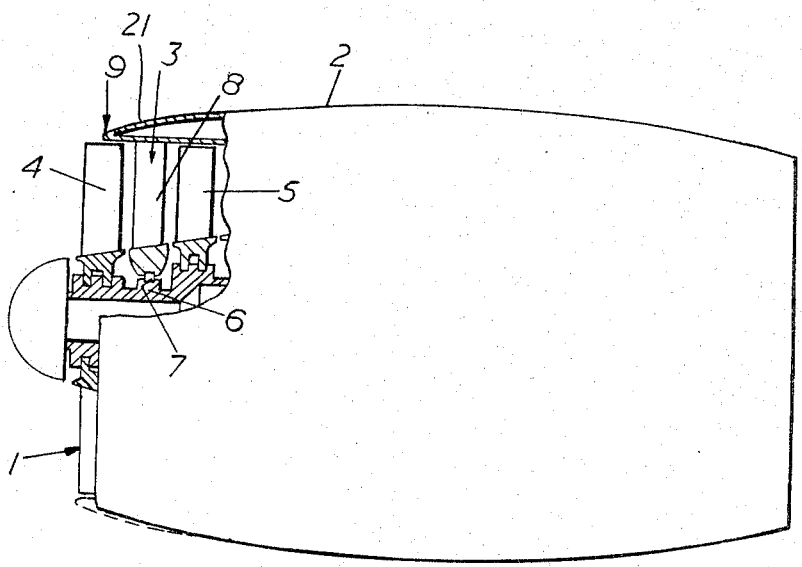
Figure 2:
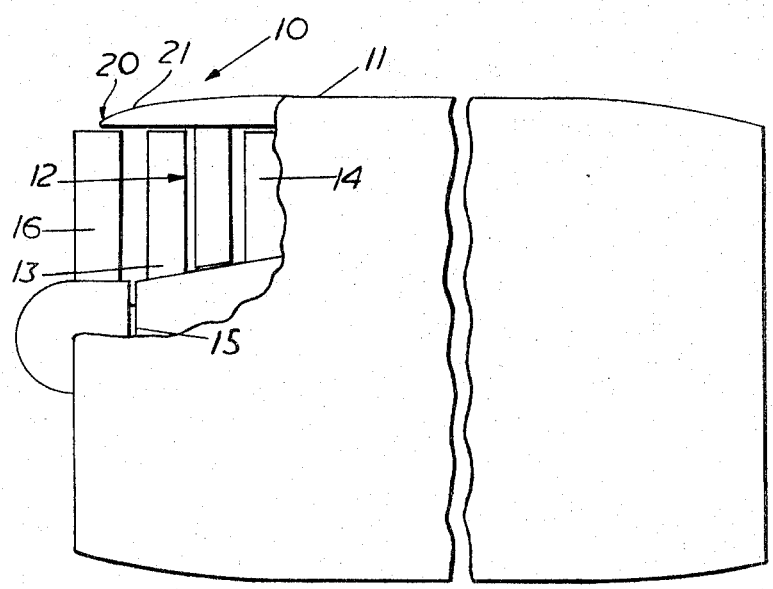

The invention is illustrated, merely by way of example, in the accompanying drawings in which:

FIGURE 1 is an elevation, partly in section, of a gas turbine engine in accordance with the present invention; and FIGURE 2 is an elevation, partly in section, of another gas turbine engine in accordance with the present invention.

Referring to FIGURE 1, a gas turbine by-pass engine 1, which may have a by-pass ratio of at least 1.5:1, has a casing 2 which may form part of a pod. The engine 1, which is not provided with any inlet guide vanes, has a compressor 3 having a number of stages of which the first stage rotor blades are shown at 4 and the second stage rotor blades are shown at 5.

The rotor blades 4, 5 are carried by the main shaft 6 of the engine. The main shaft 6 is mounted within a bearing 7 which is carried by a plurality of angularly spaced apart stator blades 8 which are mounted within the casing 2.

The casing 2 has an intake lip 9 which, as shown in FIGURE 1, has its forward edge radially aligned with the half chord points of the first stage rotor blades 4. Alternatively, the said forward edge of the intake lip 9 could be radially aligned with the leading edges of the first stage rotor blades 4. An extrados 21 of the intake lip 9 is on an outside surface of the air intake, as illustrated, but another extrados could be formed on an inside surface, if desired.

As will be appreciated, if there should be any tendency for breakaway to occur from the intake lip 9, this will be at least partially counteracted by the strong centrifugal field created by the rotor of the compressor 3.

Alhough the engine illustrated in FIGURE 1 is not provided with inlet guide vanes, it could be so provided, and in this case, the tendency for breakaway to occur from the intake lip 9 will be at least partially counteracted by the increased axial velocity caused by the inlet guide vanes.

Two cases have been illustrated in FIGURE 1, in one of which the casing 2 extends to the leading edges of the first row of rotor blades and in the other of which the casing 2 extends to the half chord points of the first row of rotor blades. Clearly the casing 2 could extend to any intermediate point or two some point downstream of the half chord points.

Referring now to FIGURE 2, a gas turbine by-pass engine 10, which may have a by-pass ratio of at least 1.5:1, has a casing 11 which may form part of a pod. The engine 10 has a stage of inlet guide vanes 16 and a compressor 12 having a number of rotor stages of which the first stage rotor blades are shown at 13 and the second stage rotor blades are shown at 14. The rotor blades 13, 14 are carried by the main shaft 15 of the engine.

The casing 11 has an intake lip 20 which, as shown in full lines in the drawing, has its forward edge disposed forwardly of the first stage rotor blades 13, the said forward edge being radially aligned with the leading edges of the inlet guide vanes 16. Alternatively the forward edge of the intake lip 20 may be radially aligned either with the half chord points of the inlet guide vanes 16 or with the trailing edges of the inlet guide vanes 16, or with any intermediate point. As with the FIGURE 1 embodiment, the intake has an extrados 21 on an outside surface thereof.

As will be appreciated, if there should be any tendency for breakaway to occur from the intake lip 20, this will be at least partially counteracted by the increased axial velocity caused by the inlet guide vanes 16.

I claim:
1. In a gas turbine engine for use in an aircraft, wherein said engine has an air intake with a leading lip and with an extrados of said lip on an outside surface of the air intake, and a stage of blades at an upstream end of the engine, the improvement comprising:
   a mounting of said blades immediately adjacent to and radialy inwardly of said air intake lip, and with said air intake lip extending forwardly at least as far as the trailing edges of said blades and no further than the leading edges of the blades, whereby the tendency of air to breakaway from said air intake lip is substantially reduced.

2. The improvement of claim 1 wherein the upstream edge of said air intake lip is radially aligned with the half-chord points of said blades.

3. The improvement of claim 1 wherein said blades are the first stage rotor blades of a compressor of the engine.

4. The improvement of claim 1 wherein said blades are inlet guide vanes, the air intake lip being disposed upstream of the first stage rotor blades of the engine.

5. The improvement of claim 4 wherein the upstream edge of said air intake lip is radially aligned with the trailing edges of said inlet guide vanes.

6. The improvement of claim 1 wherein the air intake lip is located on the leading edge of an engine casing which forms part of the engine pod.

References Cited by the Examiner
UNITED STATES PATENTS

| | | | |
|---|---|---|---|
| 1,782,155 | 11/1930 | Toscano | 244—73 |
| 2,404,767 | 7/1946 | Heppner. | |
| 2,430,398 | 11/1947 | Heppner. | |
| 2,435,091 | 1/1948 | Meyer | 230—114 |
| 3,033,494 | 5/1962 | Tyler | 60—35.6 X |
| 3,145,978 | 8/1964 | Tolson | 230—114 |

MARK NEWMAN, *Prmary Examiner.*

RALPH D. BLAKESLEE, *Examiner.*